United States Patent
Tutar et al.

(10) Patent No.: US 10,824,922 B1
(45) Date of Patent: Nov. 3, 2020

(54) SIMILARITY DETECTION SYSTEM (71) Applicant: Amazon Technologies, Inc., Seattle, WA (US)

(72) Inventors: Ismail Baha Tutar, Seattle, WA (US); Tarik Arici, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 149 days.

(21) Appl. No.: 16/218,255

(22) Filed: Dec. 12, 2018

(51) Int. Cl.
*G06K 9/00* (2006.01)
*G06K 9/72* (2006.01)
*G06K 9/66* (2006.01)
*G06N 5/04* (2006.01)
*G06F 7/02* (2006.01)
*G06T 5/00* (2006.01)

(52) U.S. Cl.
CPC .............. *G06K 9/726* (2013.01); *G06F 7/02* (2013.01); *G06K 9/66* (2013.01); *G06N 5/046* (2013.01); *G06T 5/003* (2013.01)

(58) Field of Classification Search
CPC ........ G06N 3/0454; G06N 3/08; G06F 40/30; G06F 16/3347; G06K 9/726
See application file for complete search history.

(56) References Cited

U.S. PATENT DOCUMENTS

| | | | | |
|---|---|---|---|---|
| 9,659,248 B1* | 5/2017 | Barbosa | .................. | G06F 40/40 |
| 10,162,844 B1* | 12/2018 | McCord | ............... | G06K 9/6274 |
| 2009/0210218 A1* | 8/2009 | Collobert | .............. | G06F 40/284 704/9 |
| 2018/0137404 A1* | 5/2018 | Fauceglia | ............ | G06N 3/0445 |
| 2018/0336183 A1* | 11/2018 | Lee | .......................... | G06F 40/30 |
| 2019/0108439 A1* | 4/2019 | Lu | ............................ | G06N 3/04 |
| 2019/0236056 A1* | 8/2019 | Inose | ..................... | G06N 7/005 |
| 2020/0034444 A1* | 1/2020 | Zhang | ................. | G06F 16/3347 |

OTHER PUBLICATIONS

He, Hua, and Jimmy Lin. "Pairwise word interaction modeling with deep neural networks for semantic similarity measurement." Proceedings of the 2016 Conference of the North American Chapter of the Association for Computational Linguistics: Human Language Technologies. 2016.*

* cited by examiner

*Primary Examiner* — Li Liu (74) *Attorney, Agent, or Firm* — Knobbe, Martens, Olson & Bear, LLP (57) ABSTRACT

Similarity detection methods and systems are provided that utilize a convolutional neural network model to jointly learn string matching and semantic textual similarity as an image recognition solution. For example, in some embodiments described herein, the similarity detection system may receive two strings as input, transform the two strings into two separate vectors, generate a high-resolution image and a low-resolution image, apply one or more convolutional operations to each image, and determine string matching and semantic textual similarity based at least partly on the high-resolution image and the low-resolution image.

20 Claims, 9 Drawing Sheets

SIMILARITY DETECTION SYSTEM

BACKGROUND

The amount of data that companies need to process and manage is often very large. For example, an online retail service provider may list and track thousands of items offered by a variety of individual sellers. Such huge data sets often include a variety of redundant information, such as when two different sellers create two separate listings for the same item. Because manually checking each and every data entry would be prohibitively expensive in terms of labor, time, and cost, it is desirable to teach a computing system to detect whether two data entries match or are so similar that they likely refer to the same subject matter. Traditional natural language processing ("NLP") approaches detect string matching using multiple character or token level similarity metrics to deal with typographical variations of string data.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Aspects of the present disclosure relate to utilizing image recognition-based techniques to jointly learn string matching and semantic textual similarity between two input strings in a convolutional neural network model. Determining the level of similarity or match between two input strings may be accomplished in different manners, such as using different algorithms, different filters, different model features or inputs, and/or different pooling methodologies, as will be further described below.

As will be described herein, a convolutional neural network model may treat a pair of input texts as one-dimensional character sequences, employ character-level embedding, and create a two-dimensional correspondence image or matrix by concatenating the horizontally and vertically tiled one-dimensional sequences. The convolutional neural network may process the correspondence image or matrix to learn matching and semantic similarity. The convolutional neural network may output an image and reduce it row-wise and column-wise back to one-dimensional sequences using an attention mechanism. The reduction allows the network to learn string matching in early layers and semantic similarities in later, subsequent layers. As will further be discussed below, the similarity detection system may divide the method and processes among various modules.

The task of detecting duplicate or near-duplicate strings according to previously used methods typically involves extracting a set of tokens from structured or unstructured fields in a document and generating a score based on the extent of token overlap. While this approach may successfully identify duplicates when there is high token overlap (e.g., two strings are spelled exactly the same), the approach fails to successfully identify duplicates when common typographical differences are present between two strings (e.g., abbreviations or spelling errors). For example, direct token comparison between "Black" and "BLK" may not successfully identify a duplicate because "BLK" overlaps with only three characters in "Black."

Even common heuristic approaches may not rectify the shortcomings of a direct token comparison. For example, a typical heuristic approach may involve producing fractional scores for mismatched tokens in each string based on edit distances. However, such an approach may often yield false positives in cases where subtle syntactic differences in the strings are actually important differences. For example, a heuristic approach may determine that "Car Model 001A" is a duplicate of "Car Model 002A" due to how similar the strings are, but the different model numbers may refer to two completely different types of cars. Such a heuristic approach may also yield false negatives where two strings may actually refer to the same thing. For example, there may be no duplicate detected between "4 GB external hard drive" and "4 Gigabyte external hard drive" even though a user may understand that the two strings describe the same item.

Furthermore, the task of navigating a large electronic catalog of items (e.g., a catalog with millions or billions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest and sift through detail pages of items that appear to be similar but are actually the same thing.

Similarity detection methods and systems disclosed herein address these problems, allowing users or an automated system to utilize a convolutional neural network model to jointly learn string matching and semantic textual similarity as an image recognition solution. For example, in some embodiments described herein, the similarity detection system may receive two strings as input, transform the two strings into two separate vectors, generate a high-resolution image and a low-resolution image, apply one or more convolutional operations to each image, apply one or more pooling operations to each image, determine string matching and semantic textual similarity based at least partly on the high-resolution image and the low-resolution image, generate a final similarity score, and transmit instructions to merge data entries corresponding to the similar input strings or provide other instructions related to determined item similarity. While convolutional neural network models are often used as an example herein, it will be appreciated that other types of deep learning or machine learning models may be used in some embodiments. Models that rely in some part on applying one or more convolutional operations or that include one or more convolutional layers may be particularly well-suited for implementing aspects of the present disclosure. Such types of models may be referred to herein as convolutional learning models, of which convolutional neural networks may be one example.

There are many technical and practical benefits to utilizing the similarity detection system and methods described herein. By jointly learning string matching and semantic textual similarity through the convolutional neural network, the similarity detection system may avoid or ignore tokenization errors and typographical variations between two strings, thereby allowing for a successful detection of duplicates in situations where small and unimportant variations exist between two strings (e.g., there is no important difference between "book" and "the book"). The similarity detection system may also operate at the word level through row-wise or column-wise pooling, thereby detecting the presence of duplicate words in the two input sequences. Furthermore, the similarity detection system may successfully operate on input sequences of unknown lengths. For example, matches of longer sequences naturally result in a longer, uninterrupted pattern that may be identified in the high and low resolution images, thereby indicating a stronger match than if similarity detection is implemented merely by looking for the amount of token overlap. Additionally, utilizing the similarity detection system allows for joint learning of character-level and word-level similarity functions. In contrast, other methods may need to separately define character level distances (e.g., using Levenshtein distance) and token level distances (e.g., based on Jaccard similarity). The techniques described herein also reduce the burden on computational resources. For example, the similarity detection system may merge or combine item descriptions together rather than maintain multiple data entries referring to an identical item, thereby reducing the burden on computer memory or network resources required to generate keys to separate listings in an electronic catalog. Additionally, the techniques described herein significantly reduce the inefficiencies of electronic catalog navigation, allowing users to locate items of interest with fewer steps (e.g., by merging descriptions for identical items).

Figure 1:
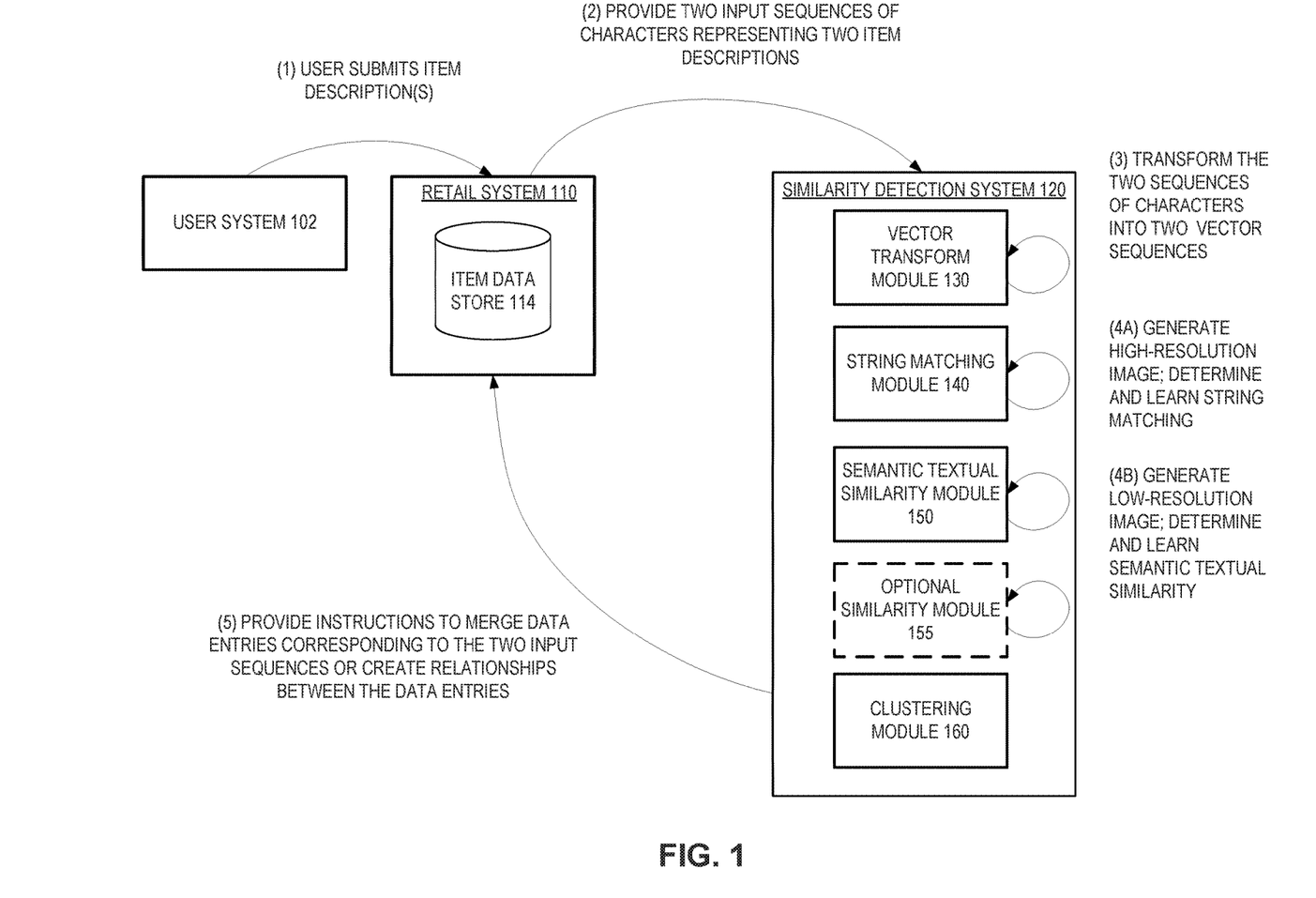
FIG. 1 is a block diagram depicting an illustrative generation and flow of data within a networked environment, according to some embodiments.

FIG. 1 is a block diagram depicting an illustrative generation and flow of data within a networked environment, according to some embodiments. The illustrative flow begins with (1) the user system 102 generating and submitting item descriptions to retail system 110. In some embodiments, user system 102 may be a computer, handheld mobile computing device, or other computing system. In some embodiments, a number of computing systems may each be used by a number of different users to submit separate item descriptions to retail system 110. In some embodiments, the item descriptions may be submitted by a user remotely over a network. Retail system 110 may receive the user submissions and store each submitted item description as an individual data entry in an item data store 114. For instance, the various items may be products offered for sale via the retail system 110 by individual sellers, manufacturers, distributors or other parties.

After item descriptions are stored in item data store 114, the retail system (2) provides two input sequences representing two item descriptions to similarity detection system 120. In some embodiments, each input sequence may be a string of characters. For example, in some embodiments, each input sequence may be a name or title of a particular item (e.g., "external hard drive"). In other embodiments, the two input sequences may include additional detailed information, such as item features or descriptions. For example, in some embodiments an input sequence may be "4 gigabyte black external hard drive." In some embodiments, a given input sequence may be a single text field submitted by a user (such as the text entry in a "description" field or "title" field for the item). In other embodiments, the retail system may assemble a string that combines multiple fields or attribute values submitted by a user for a given item (such as a "title" entry, followed by a "description" entry, followed by the brand name or manufacturer name).

Once the similarity detection system 120 receives the two input sequences from retail system 110, the similarity detection system 120 may transmit the two input sequences to vector transform module 130. Vector transform module 130 receives the two input sequences of characters and (3) transforms the two sequences into two separate sequences of vectors. In some embodiments, a sequence of vectors may comprise one or more vector components. Accordingly, for ease of explanation, a sequence of vectors (or vector sequence) may be referred to below as a vector. In some embodiments, vector transform module 130 may transform the two input sequences using character-level embedding. Specifically, in some embodiments, each character in an input sequence may be assigned a numeric index or multi-dimensional vector stored in a lookup table. For example, the letter "c" may be assigned a three-dimensional or four-dimensional vector that was previously established for the letter "c" in an embedding layer of a convolutional neural network or other model, such as the vector (0.2, 0.4, 0.8, 0.1). By way of example, in one embodiment the vector transform module 130 may receive an input sequence of characters that form human-readable words and output an n-dimensional vector based on each character's multi-dimensional vector value from a lookup table. Other methods of creating a vector sequence from the original input sequence may be utilized in other embodiments.

After transforming the two sequences into two sequences of vectors, the vector transform module 130 may transmit the two sequences of vectors to string matching module 140 and semantic textual similarity module 150. In some embodiments, string matching module 140 may (4A) generate a high-resolution image from the two vector sequences. In some embodiments, the high-resolution image may be formed by first tiling the first vector horizontally and the second vector vertically. By tiling the two vectors in such a way, an image or matrix may be formed by concatenating the horizontal and vertical tiles such that each character of the first vector (represented as the vector value looked up above) is paired with a character at a corresponding position in the second vector. By way of example, if the horizontal vector is expressed as $(x^{(1)}, x^{(2)}, \ldots, x^{(W)})$ and the vertical vector is expressed as $(x^{(1)}, x^{(2)}, \ldots, x^{(W)})$, an arbitrary pixel or cell (i, j) of the high-resolution image corresponds to characters $x^{(j)}$ and $y^{(i)}$ of the two vectors. An example of the high-resolution image will be discussed further in FIG. 4A. After forming the high-resolution image, the string matching module 140 may then determine the presence of matching strings between the two vectors.

The string matching module 140 may feed the high-resolution image into a convolutional neural network to detect the presence of matching strings between the two input sequences. In some embodiments, the string matching module 140 may apply a variety of convolutional operations to detect patterns and features in the high-resolution image. For example, in one embodiment, a convolution operation may examine a 3×3 pixel subsection of the high-resolution image, perform element wise matrix multiplication (e.g., dot product) on the high-resolution image with another 3×3 matrix corresponding to some filter, kernel, or feature detector that is to be tested. The multiplication outputs may then be added to determine a final number (e.g., a floating point number) which forms a single element of an output matrix. The output matrix may be completed by iteratively shifting the filter onto a new group of pixels in the high-resolution image and computing the dot product. In some embodiments, the output matrix may be referred to as convolved feature, activation map, or feature map. In some embodiments, the string matching module 140 may apply a variety of filter matrices to produce different feature maps of the high-resolution image. In some embodiments, the various filters may be used to form feature maps that are useful to detect matching. For example, in some embodiments, a user may alter the numerical values of the filter matrix to perform operations such as edge detection, sharpening, and blurring. The string matching module 140 may be trained to detect matching. In some embodiments, a user may initially provide the string matching module 140 curated training images with a known output (e.g., match or no match) and adjust weightings or feature parameters if the string matching module 140 gives an incorrect output. As the string matching module 140 processes more training images, it may recognize feature patterns corresponding with a match (e.g., continuous diagonal lines) and utilize error correction techniques such as backpropagation using gradient descent to update filter values, weight values, or parameter values to minimize output error.

By applying convolutional operations onto the high-resolution image to create various feature maps, the string matching module 140 may learn character-to-character matching or string matching as more patterns and features are extracted and identified in the high-resolution image. As will be discussed later, in some embodiments, the string matching module may learn that there is a match between two input sequences by recognizing or extracting diagonal curve patterns in the high-resolution image. It will be appreciated that in some embodiments, string matching module 140 is not limited to learn solely character-to-character matching. For example, in some embodiments, string matching module 140 may also learn semantic textual similarity. For example, the string matching module 140 and the semantic similarity module 150 may each apply separate convolutional neural network models that were each trained to determine a similarity score from an image provided as input (e.g., they may have been trained differently based in part on analyzing images of different image resolutions). The score output by the model used by the string matching module 140 may primarily represent an extent of string matching (though semantic textual similarity may be represented in the score to a lesser extent), while the score output by the model used by the semantic similarity module 150 may primarily represent an extent of semantic textual similarity (though string matching may be represented in the score to a lesser extent).

The semantic textual similarity module 150 may (4B) generate a low-resolution image to analyze semantic textual similarity. A low-resolution image may be created in some embodiments by concatenating the horizontally tiled vector and vertically tiled vector and applying convolutional operations or layers on the input sequences. In some embodiments, the convolutional operations may then comprise pooling operations to reduce the dimensionality of each feature map to only the most important features and patterns. For example, in some embodiments, the low-resolution image may be formed by applying a convolutional layer with strided max-pooling on the input sequences. However, other embodiments may utilize other pooling operations to form the low-image resolution. For example, the semantic textual similarity module 150 may utilize attention pooling, average pooling or minimum pooling as opposed to max pooling.

The semantic textual similarity module 150 may feed the low-resolution image into a convolutional neural network to determine semantic textual similarity between the two input sequences. Similarly to the string matching module 140, the semantic textual similarity module 150 may utilize a variety of convolutional operations and pooling to determine semantic textual similarity between two input sequences. As will be appreciated, the "images" referred to as a high-resolution image and low-resolution image above may not be images that have any meaning to a human visually and may not be formatted in a manner that lends itself to visual display, but rather may be matrices that can be treated as images by convolutional neural networks or other models in order to take advantage of various machine learning techniques that are primarily used in the computer vision or image recognition fields. In this manner, the initial technical problem related to determining string similarity may be effectively recast as a computer vision problem with a different set of technical solutions as those traditionally applied to the initial text-based problem. The semantic textual similarity module 150 may be trained to detect semantic similarity. In some embodiments, a user may initially provide the semantic textual similarity module 150 curated training images with a known output (e.g., similar or not similar) and adjust weightings or feature parameters if the semantic textual similarity module 150 gives an incorrect output. As the semantic textual similarity module 150 processes more training images, it may recognize feature patterns associated with high levels of similarity (e.g., continuous diagonal lines) and utilize error correction techniques such as backpropagation using gradient descent to update filter values, weight values, or parameter values to minimize output error. It will be appreciated that in some embodiments, semantic textual similarity module 150 is not limited to learn solely semantic textual similarity. For example, in some embodiments, semantic textual similarity module 150 may also learn character-to-character matching, as mentioned above.

Both the string matching module 140 and the semantic textual similarity module 150 may utilize pooling operations and batch normalization to learn string matching and semantic textual similarity jointly. The convolution operations may be implemented in a plurality of convolutional layers or hidden layers in the convolutional neural network. For example, the semantic textual similarity module 150 may apply three different filters onto the low-resolution image through three different convolutional layers. Both the string matching module 140 and semantic textual similarity module 150 may output a match or similarity score to indicate the level of matching or semantic similarity between the two input sequences. Based at least partly on the two outputs, the similarity detection system 120 may generate a final similarity score to indicate an overall match or similarity between the two input sequences. In some embodiments, the final similarity score may be a number ranging from 0 to 1, with 0 indicating no match and 1 indicating a perfect match.

Optional similarity module 155 may also generate a high-resolution image or low-resolution image as discussed above in connection with string matching module 140 and semantic textual similarity module 150, and determine a score representing similarity between two sequences represented in the image. The score output may represent similarity that falls somewhere on a spectrum from representing string matching or representing semantic textual similarity (likely a blend or hybrid of the two). Optional similarity module 155 may also utilize pooling operations and batch normalization to learn string matching and semantic textual similarity jointly with string matching module 140 and semantic textual similarity module 150. Although only one optional similarity module 155 is displayed in FIG. 1, it will be appreciated that, in some embodiments, similarity detection system 120 comprises more than one instance of optional similarity module 155. In some embodiments, similarity detection system 120 may not include optional similarity module 155 at all.

The clustering module 160 may (5) generate and transmit instructions to merge data entries based at least partly on the final similarity score or provide other instructions related to item similarity. In some embodiments, the clustering module may transmit instructions to merge records for the two items in the item data store 114 if the final similarity score exceeds a predetermined threshold. For example, the clustering module 160 may transmit instructions to merge if the final similarity score of two input sequences exceeds 0.9. If the retail system 110 receives such instructions, then the retail system 110 may consolidate the two separate entries corresponding to the two input sequences into only one data entry in item data store 114. This may save storage space or memory by no longer storing the same item attributes separately for the now-merged entries (e.g., the two original records may have each separately stored the same attribute values for attributes such as color, weight, brand name, etc., but differed in minor ways for other attributes). In some embodiments, the merging may occur automatically without human input. In some embodiments, clustering module 160 may provide instructions to create relationships between data entries. In some embodiments, clustering module 160 may instead transmit other instructions related to item similarity, such as instructions to flag relevant data entries for future review by a user of the retail system 110, cluster the two items together, or otherwise associate the two items with each other. The cluster or item association information may subsequently be used by the retail system 110, for example, to determine that only one of the similar items should be included in a given set of search results or recommendations to a user.

Figure 2:
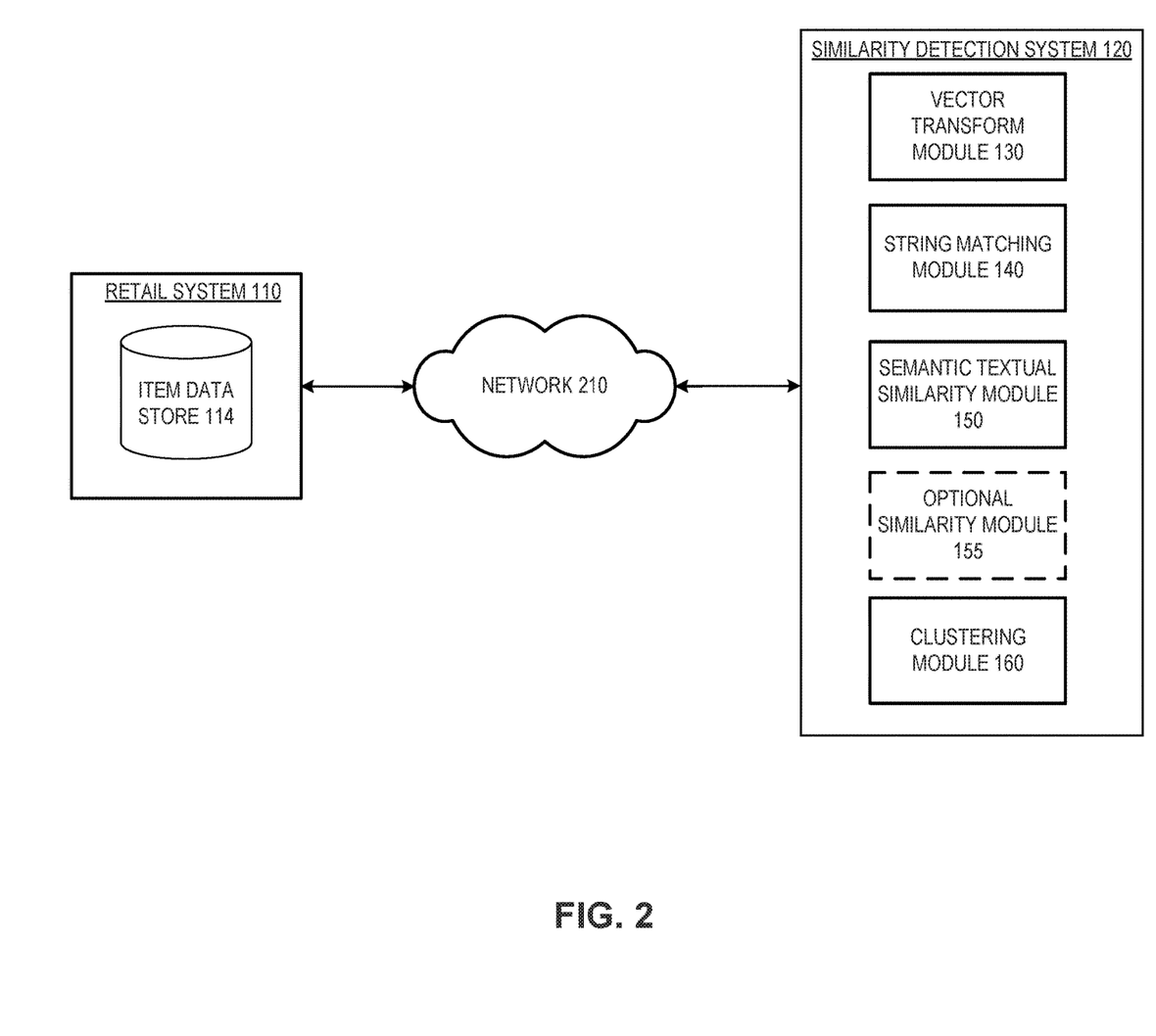
FIG. 2 is an illustrative networked environment and system architecture of a similarity detection system, according to some embodiments.

FIG. 2 is an illustrative networked environment and system architecture of a similarity detection system as discussed in FIG. 1. Retail system 110 may represent a large commercial online retailer that processes thousands, millions, or billions of transactions per day, and item data store 114 may be configured to store item descriptions as separate data entries. The data entries stored in item data store 114 may be transmitted over network 210 to similarity detection system 120. Similarity detection system 120 may comprise vector module 130, string matching module 140, semantic textual similarity module 150, and clustering module 160. The similarity detection system 120 and its component modules may be configured to perform operations as discussed earlier in connection with FIG. 1. While FIG. 2 contemplates a retail system 110, other embodiments are not limited to the commercial retail context. For example, aspects of the present disclosure provide benefits for detecting similarity among records or entries of a variety of types that may be stored in an electronic data store, particularly where fields or elements of the records are stored as text strings.

Figure 3:
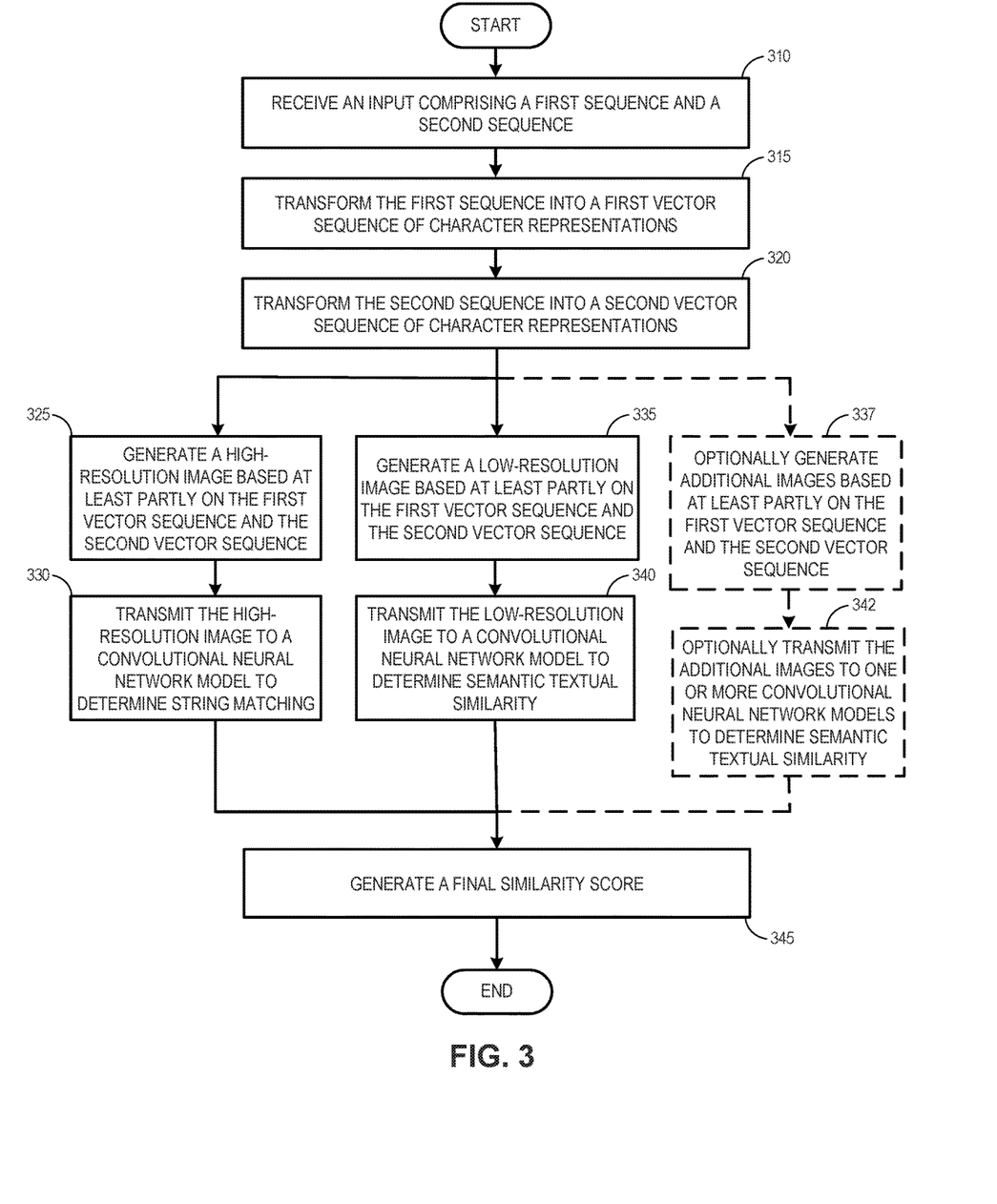
FIG. 3 is a flow diagram depicting an example method of similarity detection, according to some embodiments.

FIG. 3 is an illustrative block diagram depicting an example method of similarity detection, according to some embodiments. The example method begins at block 310, where the similarity detection system receives an input comprising a first sequence and a second sequence of characters. At block 315, the similarity detection system transforms the first sequence into a first sequence of vectors, where each vector represents a different character of the first sequence of characters. For example, as described above, each character of the first sequence may be represented in the first vector by a multi-dimensional vector previously assigned to the given character (e.g., a given letter of the alphabet) based on an earlier training process. At block 320, the similarity detection system transforms the second sequence of characters into a second sequence of vectors. In some embodiments, the first sequence of vectors and the second sequence of vectors may each comprise one or more vector components. Accordingly, for ease of explanation, a sequence of vectors (or vector sequence) may be referred to below as a vector. Additionally, although block 320 is executed after block 315 in FIG. 3, other orders of operations are possible in other embodiments. For example, in some embodiments, the similarity detection system may transform the second sequence into a second vector before transforming the first sequence into a first vector of characters. Blocks 315 and 320 may be performed by the vector transform module 130 of FIG. 2.

At block 325, the similarity detection system may generate a high-resolution image based at least partly on the first vector and the second vector. The similarity detection system may transmit the high-resolution image to a first convolutional neural network model to determine string matching. As discussed earlier, blocks 325 and 330 may be performed by the string matching module 140 according to the operations discussed earlier in FIG. 1. At block 335, the similarity detection system may generate a low-resolution image based at least partly on the first vector and the second vector. The method may proceed to block 340 when the similarity detection system transmits the low-resolution image to a convolutional neural network model to determine semantic textual similarity according to the process described in FIG. 1. In some embodiments, blocks 335 and 340 may be executed by the semantic textual similarity module 150. In some embodiments, blocks 330 and 340 may be executed in parallel and simultaneously using two separate convolutional neural networks according to the process described in FIG. 1. In other embodiments, blocks 330 and 340 may be performed serially.

Additionally, blocks 337 and 342 may be optionally executed to generate additional images based at least partly on the first vector and the second vector and determine semantic textual similarity as mentioned in the discussion of blocks 325, 330, 335, and 340 above. In some embodiments, multiple images of varying resolutions may be generated and transmitted through one or more convolutional neural network models. For example, various models could be applied to analyze images of different resolutions to determine similarity at the sentence level or other level, in addition to earlier-applied models that may be configured to identify similarity at the word level. The optional process described in blocks 337 and 342 are not limited to determining semantic textual similarity. For example, in some embodiments, the additional images may be transmitted to one or more convolutional neural network models to determine character-to-character matching. In some embodiments, the method of FIG. 3 may not include blocks 337 and 342.

Once the similarity detection system determines string matching and semantic textual similarity in the convolutional neural networks in blocks 330, 340, and optionally 342, the similarity detection system may proceed to block 345 and generate a final similarity score. In some embodiments, the final similarity score may be a numeric range from 0 to 1, with 0 indicating no match and 1 indicating a perfect match between the two input sequences. In some embodiments, the final score may represent an estimated likelihood that a human would perceive the two input strings as having a similar meaning or describing the same item. For example, the models may have been trained based on a large set of item pairings that had been tagged as either matching or dissimilar items (e.g., based on item records that a human user had indicated should be merged), such that the models have learned which textual differences tend to be important and which are minor differences that don't have a large effect on human-perceived similarity of meaning.

Figure 4A:
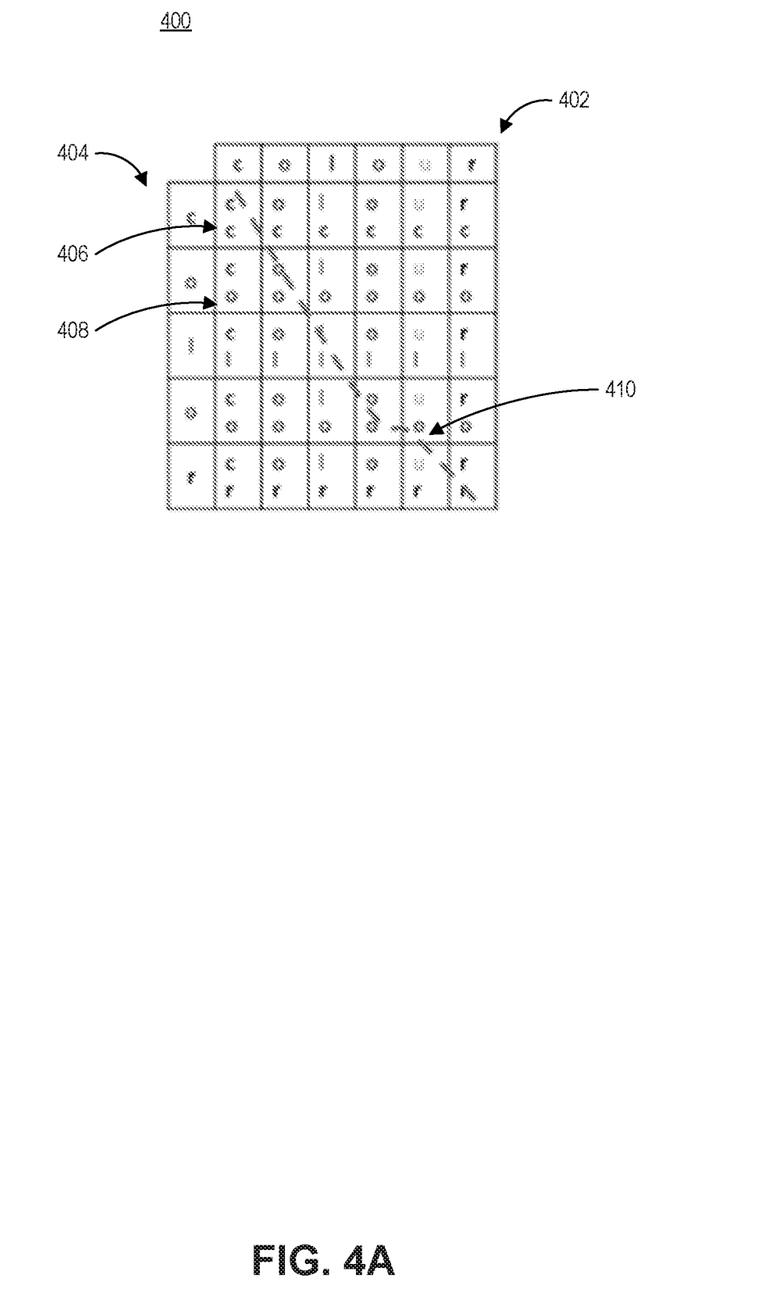
FIGS. 4A, 4B and 4C are visual representations of example images or matrices generated by the similarity detection system, according to some embodiments.
Figure 4B:
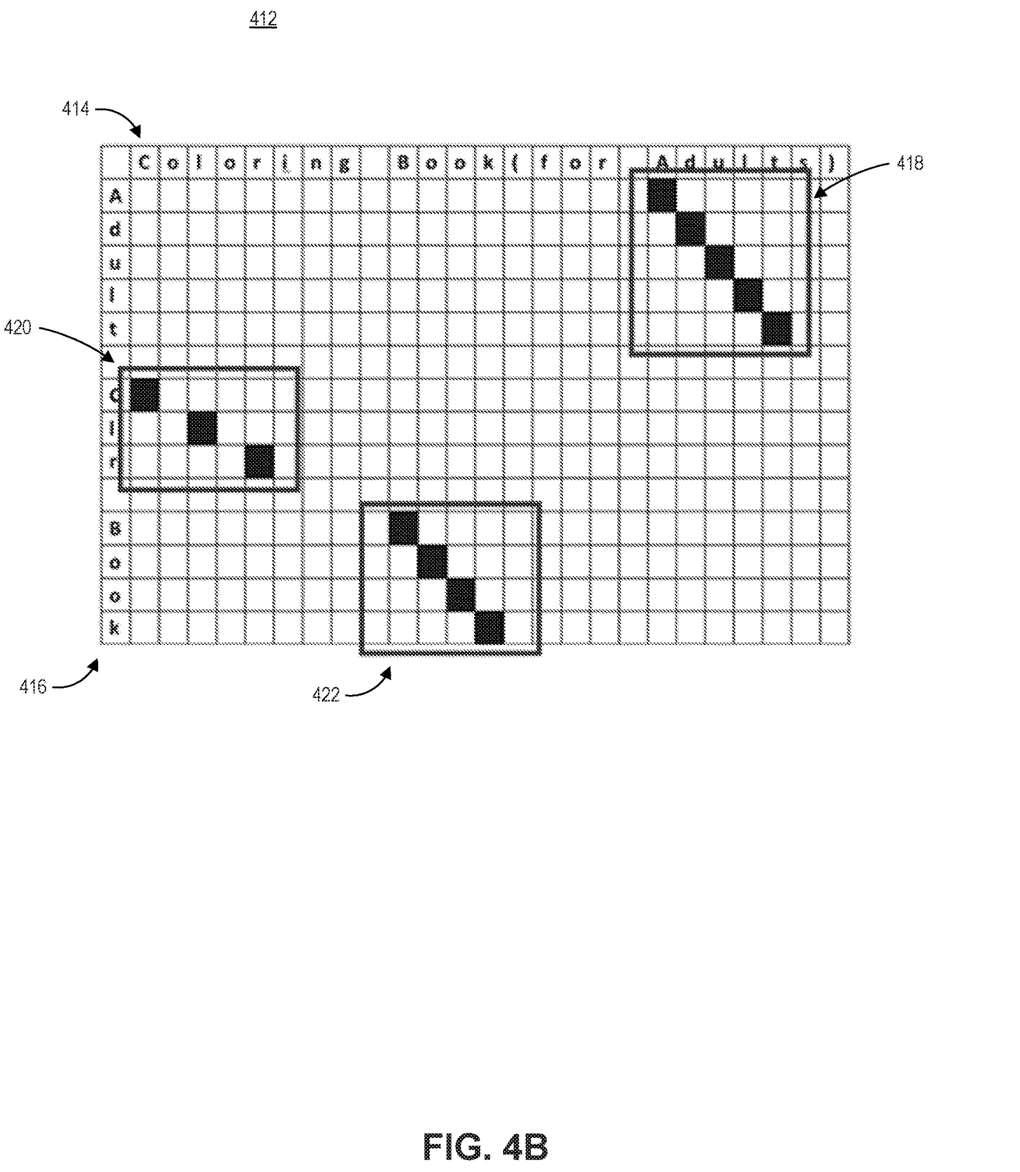
Figure 4C:
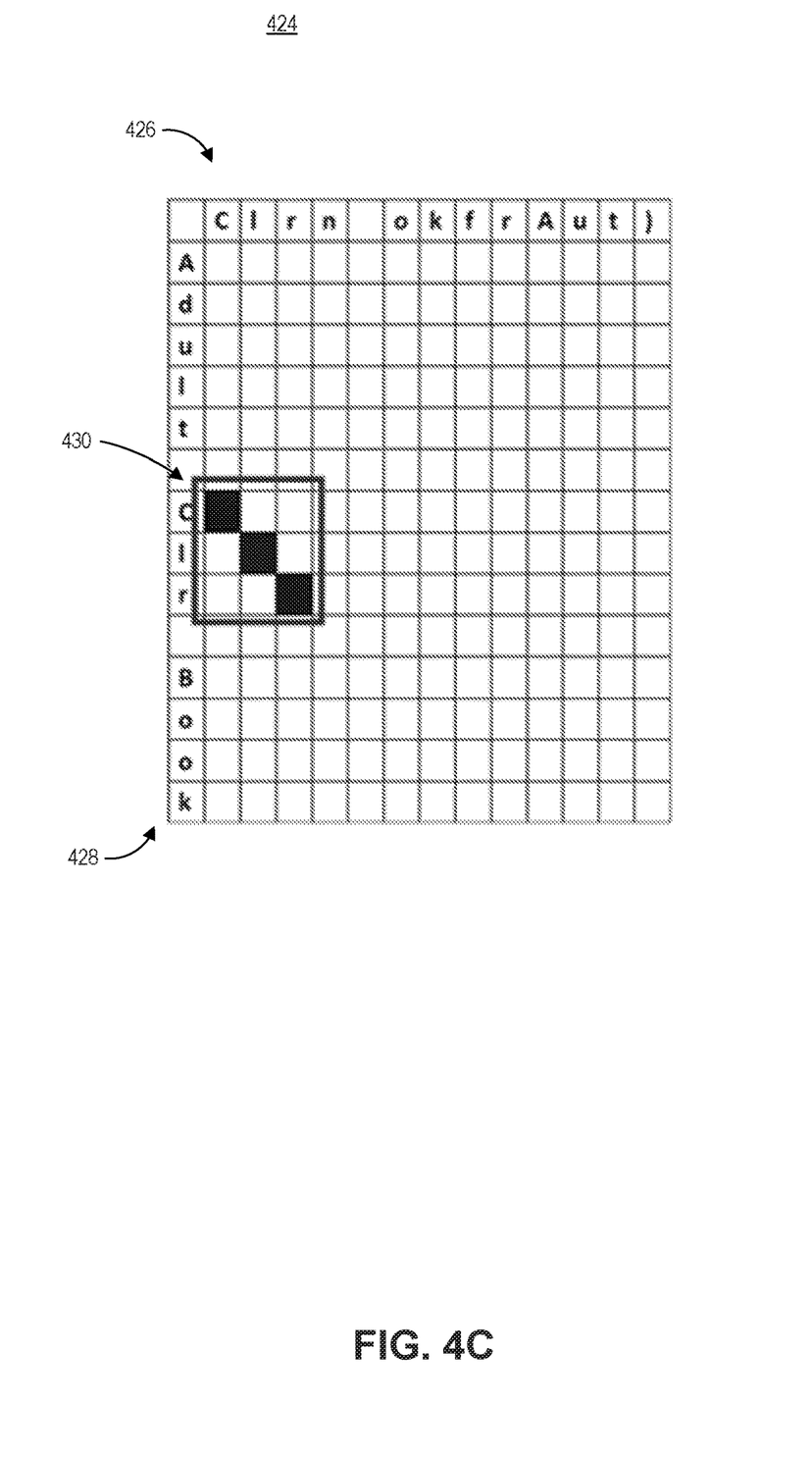

FIGS. 4A, 4B, and 4C are each visual representations depicting example images generated by the similarity detection system, according to some embodiments. FIG. 4A specifically is an example correspondence matrix 400 that may be used as a high-resolution image to determine string matching. Correspondence matrix 400 comprises a horizontal vector 402 (represented by the characters of the string "colour") and a vertical vector 404 (represented by the characters of the string "color"). Each vector 402 and 404 corresponds to one of the two input sequences received by the similarity detection system. In some embodiments, each component cell of vectors 402 and 404 may be a 4-dimensional vector corresponding to each character from the input string Cell 406 shows a cross section of the first characters of vectors 402 and 404. In the particular example presented in FIG. 4A, the first character in vector 402 matches the first character in vector 404. In contrast, cell 408 corresponds to the first character in vector 402 ("c") and the second character in vector 404 ("o"), thereby illustrating a cross section where the corresponding characters from vectors 402 and 404 do not match. In some embodiments, correspondence matrix 400 may be created by tiling vector 402 horizontally, tiling vector 404 vertically, and concatenating the vectors at the same pixel location. In some embodiments, a match or similarity at any locality or region of pixels in the image may result in a colored curve. In some embodiments, one or more convolutional neural network layers may learn to detect the colored curves. By way of example, a curve may grow diagonally in case of a match, may bend horizontally or vertically, or may discontinue in case of a mismatch among areas in the concatenated image. In such an example, the length and color of the bending and discontinuity may determine the degree of matching.

In the particular example of FIG. 4A, pattern 410 (represented by a dashed line) is a visual representation of a pattern that the similarity detection system may detect upon applying various convolutional operations onto matrix 400. In this particular example, the system may iteratively examine each cell in the matrix to see if they contain characters from both vectors that match perfectly. By examining the whole matrix 400 in such a way, the similarity detection system may extract a diagonal line feature or pattern from the matrix 400. Through supervised training and backpropagation, the similarity detection system may then learn that a continuous, straight, diagonal pattern corresponds to a high likelihood of string matching. While the pattern 410 is clearly illustrated on top of matrix 400 for ease of explanation, an actual diagonal line may not necessarily be drawn by the similarity detection system. Furthermore, while FIGS. 4A, 4B, and 4C portray matrices with clearly defined and bordered cells, such clear and explicit divisions are not required in an image and are merely used as a visually-intuitive example to represent different regions of concatenated pixels. Similarly, the presence of two distinct letters in a given cell in FIG. 4A is for illustrative purposes, and it will be appreciated that what appears in a given position in the actual matrix (or pixel location in the image) may be a vector or set of numeric values interpreted as a color value by the model (e.g., analogous to RGB or CMYK values in a traditional image format).

FIG. 4B displays an example matrix 412 where the two vectors 414 and 416 do not match perfectly but are similar semantically. Matrix 412 may be used as a low-resolution image to determine semantic textual similarity in some embodiments. Vector 414 corresponds to the input sequence "Coloring Book(for Adults)" and vector 416 corresponds to the input sequence "Adult Clr Book." Matrix 412 has many cells that do not have a perfect match between the character in vector 414 and the corresponding character in vector 416. However, boxes 418, 420, and 422 are outlined to indicate areas where diagonal patterns indicating a match may be found within matrix 412. While there are a number of cells that do not have a perfect match, and thus no diagonal pattern, the similarity detection system may identify semantic textual similarity on the input sequences as a whole after examining the entire matrix 412 due to the presence of multiple, broken diagonal patterns in the matrix. Beneficially, the similarity detection system may also detect an exact match on a word-level basis by recognizing a perfectly straight, continuous diagonal pattern in box 418.

In contrast to FIG. 4A, the diagonal patterns in FIG. 4B are represented as regions of binary black and white cells, with black indicating a match of concatenated pixels and white indicating no match. Such a visual representation of the diagonal pattern is used merely as a visually-intuitive representation of matching in various areas of concatenated pixels and are not required in an image. In other embodiments, regions of concatenated pixels may have large ranges of values interpreted as different colors via multi-dimensional arrays that are analogous to the color values at a pixel location in a traditional image.

FIG. 4C displays an example matrix 424 where the two input sequences contain multiple abbreviations or misspellings. In the particular example of matrix 424, horizontal vector 426 is a downsampled or pooled version of horizontal vector 414 in FIG. 4B. While the similarity detection system may not recognize any features to suggest exact matching for the two input sequences as a whole, the similarity detection system may nonetheless recognize a perfect match on a word-level and character-level basis in the area corresponding to box 430. The similarity detection system may be trained to interpret such a pattern as indicative of semantic textual similarity but not exact matching. Like in FIG. 4B, the binary black and white cells are used to explain and highlight the presence of a diagonal pattern that may be detected by the convolutional neural network model and are not meant to be interpreted as requirements for an image. In other embodiments, regions of concatenated pixels may have large ranges of values interpreted as different colors via multi-dimensional arrays that are analogous to the color values at a pixel location in a traditional image. While the similarity detection system may interpret block 420 in FIG.

4B as a weak pattern indicating a low likelihood of match or similarity, the similarity detection system may recognize and interpret the pattern in block 430 as a stronger indication of character-to-character match or semantic similarity.

Figure 5A:
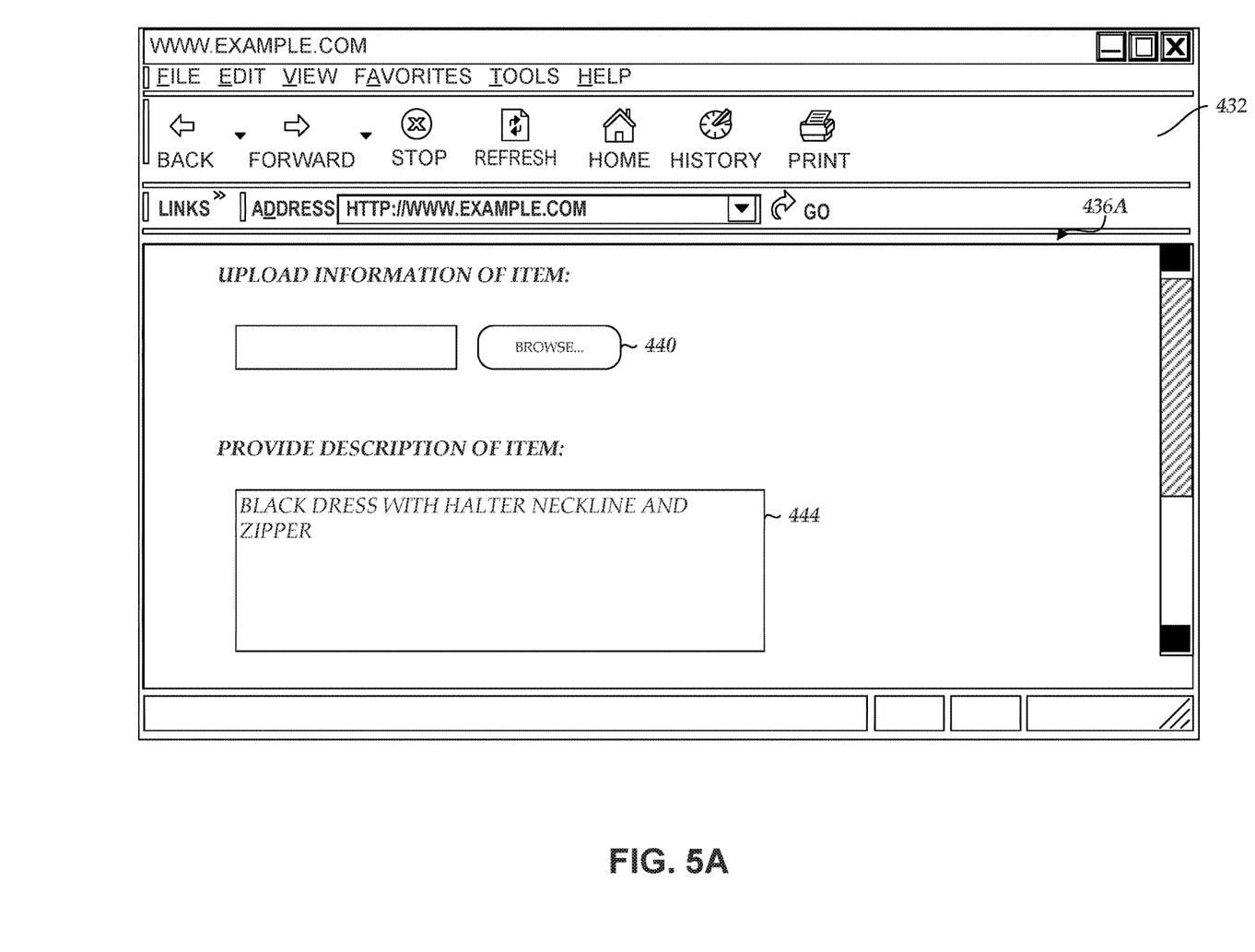
FIGS. 5A-5B illustrate an example of a representation of a network page displayed on a user system, such as the user system of FIG. 1.
Figure 5B:
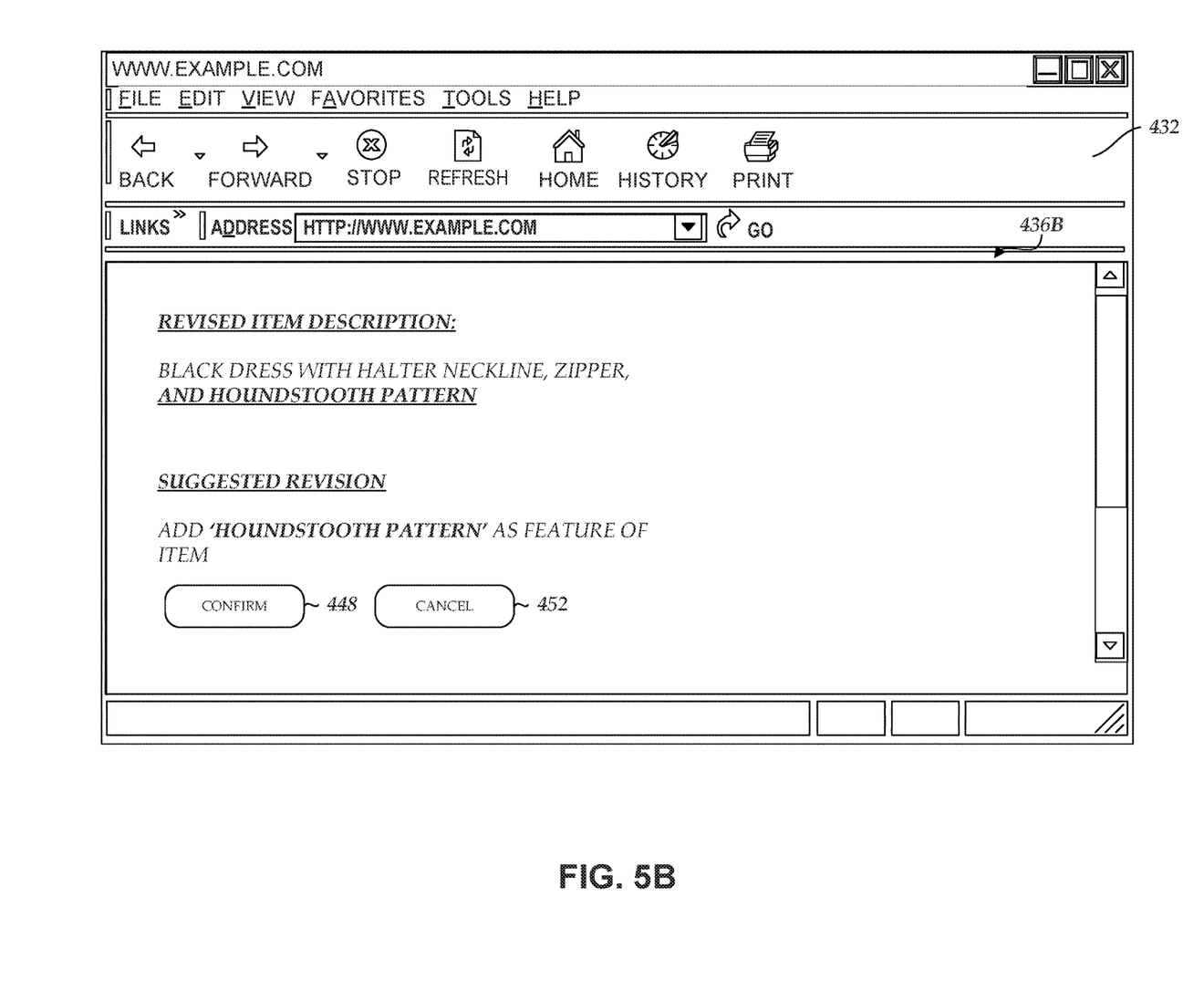

FIGS. 5A-5B illustrate an example of a representation of network pages 436A and 436B displayed on a user device, such as the user system 102. The network page 436A may be displayed within the user interface of the browser application 432 of the user system 102. The user utilizing the user system 102 in this instance may be, for example, a seller or merchant who desires to list a product or other item for sale via the retail system 110. As illustrated in FIG. 5A, the network page 436A requests a user to upload an item description. For example, the user may choose a text file saved locally to the user system 102 using browse button 440. The user may choose to upload a description to generate a new item listing. The user may also enter an item description directly into field 444. For example, the user may enter the item description such that it reads "black dress with halter neckline and zipper."

FIG. 5B illustrates an example of a representation of a network page 436B that allows a user to merge or edit item descriptions. Once the user has uploaded the item description as described in FIG. 5A, retail system 110 may transmit the uploaded item description as an input sequence to the similarity detection system. The similarity detection system may then retrieve one or more character sequences already stored in the electronic catalog of the retail system (e.g., a description of an item previously added to the electronic catalog by this user or another seller) to determine whether the user-submitted item is in fact the same as an existing item in the catalog despite differences in item descriptions. Utilizing the techniques described herein, the similarity detection system may generate a final score indicating a strong likelihood that the uploaded item description and the existing item description are identical or are semantically similar. The clustering module 160 may then provide user system 102 instructions or options to merge the new listing with the previously stored item description. For example, the clustering module 160 may asynchronously transmit a push notification, email, text message, or alert to user system 102 with a link to edit or merge the uploaded item description. For example, clustering module 160 may output a list of possible item descriptions based on the processing of the similarity detection system.

In this example, the similarity detection system may determine that the uploaded item description matches the existing item description. In the example of FIG. 5B, the second item description is a black dress with a halter neckline, a zipper, and a houndstooth pattern. The item description uploaded by the user, however, does not mention the houndstooth pattern. Thus, the clustering module 160 may automatically make changes to the uploaded item description, merge item descriptions, or request verification from the user before making changes. For example, as illustrated in FIG. 5B, the clustering module 160 may provide instructions to revise the item description, identify the changes made, and request the user to confirm the changes by selecting confirm button 448 or to disregard the suggested changes by selecting cancel button 452. In some embodiments, merging item descriptions may occur automatically without human input, either at the time of item submission or as a batch process (e.g., the similarity detection system checking all newly added item descriptions received over some time period, such as an hour or a day, for matches in the catalog). In some embodiments, the user may suggest changes to existing item descriptions in the catalog if the user is associated with a score indicating a high likelihood of reliability or trustworthiness (e.g., the user has a maximum reliability rating of 5 from a reliability score ranging from 0 to 5). Thus, aspects of the present disclosure may improve the accuracy and reliability of item listings other than just the description being added by a user in a given instance.

Figure 6:
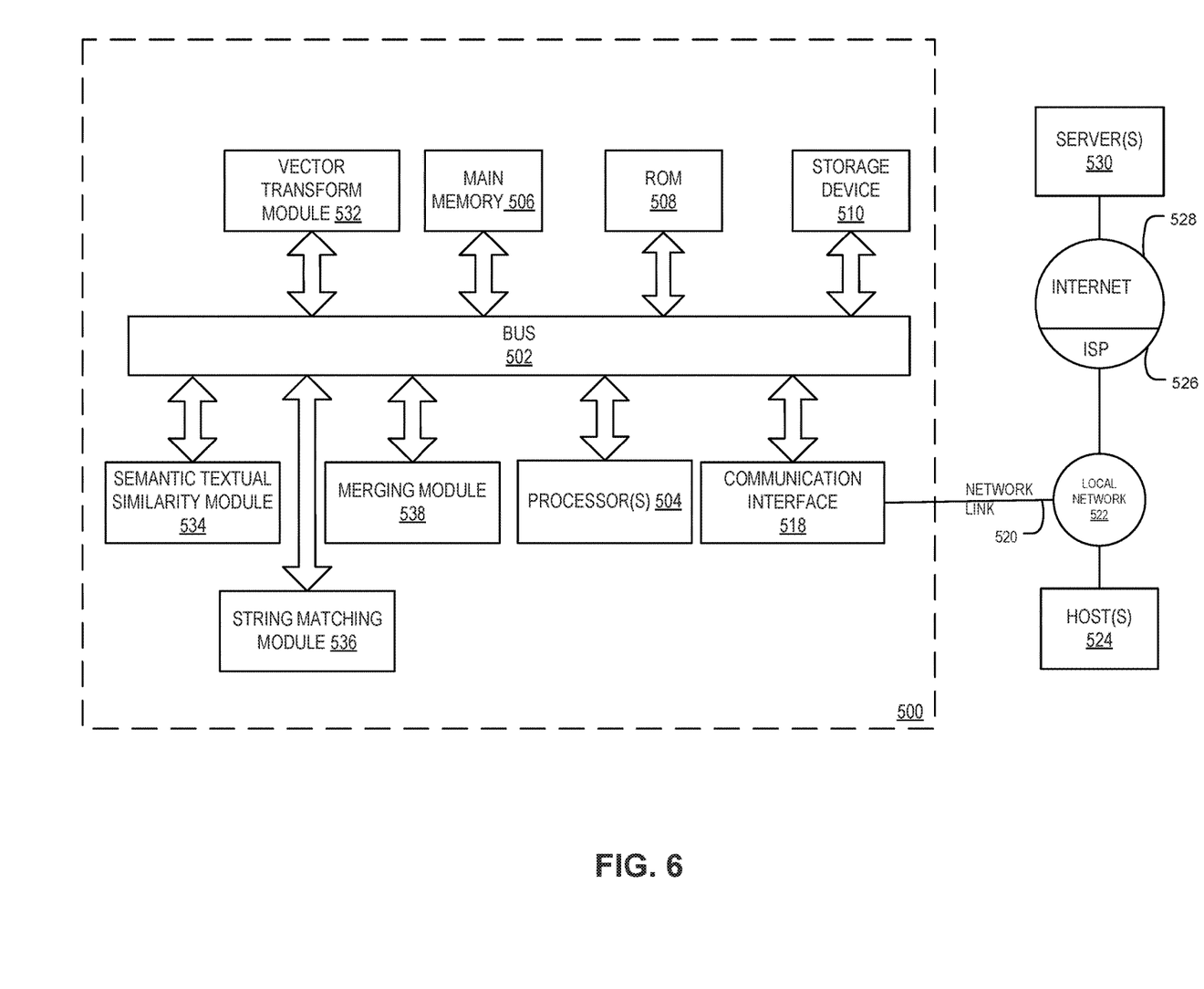
FIG. 6 is a visual representation of an example computing system configured to perform similarity detection.

FIG. 6 is a block diagram of an illustrative computing system that may implement one or more of the features described. The computing system 500 may be configured to perform all or some of the features of the similarity detection system 120. The computing system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

The computing system 500 also includes a main memory 506, such as a random access memory (RAM), cache, or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render the computing system 500 into a special-purpose machine that is customized to perform the operations specified in the instructions.

The computing system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computing system 500 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 500 to be a special-purpose machine. According to one embodiment, the techniques herein may be performed by the computing system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

As part of a special-purpose machine, the computing system 500 may include vector transform module 532, semantic textual similarity module 534, string matching module 536, and clustering module 538. According to one embodiment, vector transform module 532 may receive as input two strings or sequences and convert them into two vectors through character-level embedding. In some embodiments, semantic textual similarity module 534 and string matching module 536 may respectively generate a low-resolution and high-resolution image to run through separate convolutional neural network models to determine string matching and semantic textual similarity. Convolutional neural network models utilized by modules 534 and 536 may be stored in storage device 510. According to one embodiment, clustering module 538 may transmit instructions through communication interface 518 to one or more servers 530. The instructions transmitted by the clustering module 538 may be stored in storage device 510 in one embodiment.

Various forms of computer readable storage media may be involved in carrying one or more sequences of one or more computer readable program instructions to processor 504 for execution. For example, the instructions may initially be carried on a magnetic disk or solid state drive of a remote computer. The bus 502 may carry data to main memory 506, from which processor 504 retrieves and executes the instructions. The instructions received by main memory 506 may optionally be stored on storage device 510 either before or after execution by processor 504.

The computing system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the Internet 528 to a server 530.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a non-transitory computer-readable storage medium storing computer-executable instructions; and
one or more hardware processors in communication with the computer-readable memory and configured by the executable instructions to at least:
obtain a first sequence of characters and a second sequence of characters, wherein the first sequence describes a first item in a data store and the second sequence describes a second item in the data store;
transform the first sequence of characters into a first vector sequence;
transform the second sequence of characters into a second vector sequence, wherein the first vector sequence and the second vector sequence each comprise multi-dimensional vectors;
generate a first image based at least partly on the first vector sequence and the second vector sequence, the first image comprising a first matrix, wherein a value at an individual position in the first matrix is based at least partly on both a value from the first vector sequence and a value from the second vector sequence;
transmit the first image to a first convolutional neural network model, the first convolutional neural network model configured to extract one or more first image features;
generate a second image based at least partly on the first vector sequence and the second vector sequence, wherein the second image is formed at least in part by applying a convolution layer to a second matrix with values based at least partly on the first vector sequence and the second vector sequence;
transmit the second image to a second convolutional neural network model, the second convolutional neural network model configured to extract one or more second image features;
generate a string matching score based at least partly on the one or more first image features;
generate a semantic similarity score based at least partly on the one or more second image features;
generate a final similarity score based at least partly on the string matching score and the semantic similarity score, the final similarity score representing an estimated likelihood that the first sequence of characters and the second sequence of characters would be perceived by a human as having similar meanings to each other; and
merge entries automatically for the first item and the second item in the data store based at least partly on the final similarity score.

2. The system of claim 1, wherein the first matrix is generated by tiling the first vector sequence horizontally, tiling the second vector sequence vertically, and concatenating values from the tiled first vector sequence and the tiled second vector sequence.

3. The system of claim 1, wherein the first image and the second image are transmitted simultaneously to the first convolutional neural network model and the second convolutional neural network model respectively.

4. A system comprising:
a non-transitory computer-readable storage medium storing computer-executable instructions; and
one or more hardware processors in communication with the computer-readable memory and configured by the executable instructions to at least:
obtain a first sequence of characters and a second sequence of characters, wherein the first sequence is associated with a first item in a data store and the second sequence is associated with a second item in the data store;
transform the first sequence of characters into a first vector sequence;
transform the second sequence of characters into a second vector sequence;
generate a first image based at least partly on the first vector sequence and the second vector sequence, the first image comprising a first matrix with values based at least partly on the first vector sequence and the second vector sequence;
transmit the first image to a first convolutional learning model, the first convolutional learning model configured to determine an extent to which portions of the first vector sequence and the second vector sequence match each other;
generate a second image based at least partly on the first vector sequence and the second vector sequence, wherein the second image is formed by applying one or more convolution operations to a second matrix with values based at least partly on the first vector sequence and the second vector sequence;
transmit the second image to a second convolutional learning model, the second convolutional learning model configured to determine semantic textual similarity between the first sequence represented by the first vector sequence and the second sequence represented by the second vector sequence;
generate a final similarity score based at least partly on output of the first convolutional learning model and output of the second convolutional learning model; and
store an association between the first item and the second item in the data store based at least partly on the final similarity score.

5. The system of claim 4, wherein the first sequence of characters and the second sequence of characters each comprise strings of alphanumeric text.

6. The system of claim 4, wherein transforming the first sequence of characters into a first vector sequence comprises selecting, for each character in the first sequence, values previously associated with the character in a stored data structure.

7. The system of claim 4, wherein the first image has a higher resolution than the second image.

8. The system of claim 4, wherein the first image and the second image are transmitted simultaneously to the first convolutional learning model and the second convolutional learning model respectively.

9. The system of claim 4, wherein the first convolutional learning model is configured to determine the extent to which portions of the first vector sequence and the second vector sequence match each other based on two or more sets of colors, shapes, or patterns detected in the first image.

10. The system of claim 4, wherein the first convolutional learning model is configured to extract one or more first image features by:
 applying one or more convolution operations to the first image; and
 applying one or more pooling operations to the first image.

11. The system of claim 10, wherein the one or more convolution operations comprise at least one of edge detection, sharpening, or blurring operations.

12. The system of claim 10, wherein the one or more pooling operations comprise at least one of attention-pooling, max-pooling, min-pooling, average-pooling, or sum-pooling.

13. The system of claim of claim 4, wherein the first convolutional learning model is configured to determine the extent to which portions of the first vector sequence and the second vector sequence match at least in part by detecting one or more diagonal line patterns in the first image.

14. A computer-implemented method comprising:
 obtaining a first sequence of characters and a second sequence of characters, wherein the first sequence is associated with a first item in a data store and the second sequence is associated with a second item in the data store;
 transforming the first sequence of characters into a first vector sequence;
 transforming the second sequence of characters into a second vector sequence;
 generating a first image based at least partly on the first vector sequence and the second vector sequence, the first image comprising a first matrix with values based at least partly on the first vector sequence and the second vector sequence;
 transmitting the first image to a first convolutional learning model, the first convolutional learning model configured to determine an extent to which portions of the first vector sequence and the second vector sequence match each other;
 generating a second image based at least partly on the first vector sequence and the second vector sequence, wherein the second image is formed by applying one or more convolution operations to a second matrix with values based at least partly on the first vector sequence and the second vector sequence;
 transmitting the second image to a second convolutional learning model, the second convolutional learning model configured to determine semantic textual similarity between the first sequence represented by the first vector sequence and the second sequence represented by the second vector sequence;
 generating a final similarity score based at least partly on output of the first convolutional learning model and output of the second convolutional learning model; and
 storing an association between the first item and the second item in the data store based at least partly on the final similarity score.

15. The computer-implemented method of claim 14, wherein the first convolutional learning model is further configured to reduce the dimensionality of one or more feature maps through downsampling or subsampling.

16. The computer-implemented method of claim 14, wherein the first convolutional learning model and the second convolutional learning model are further configured to apply rectified linear unit operations.

17. The computer-implemented method of claim 14, wherein the first convolutional learning model and the second convolutional learning model each identify one or more diagonal line patterns.

18. The computer-implemented method of claim 14, wherein the first image and the second image are transmitted simultaneously to the first convolutional learning model and the second convolutional learning model respectively.

19. The computer-implemented method of claim 14, wherein the first convolutional learning model and the second convolutional learning model are further configured to utilize gradient descent to train the first convolutional learning model and the second convolutional learning model respectively.

20. The computer-implemented method of claim 14, further comprising:
 identifying a difference between the first sequence of characters and the second sequence of characters; and
 generating a user interface displaying one or more recommended edits to the first sequence of characters that would cause the first sequence of characters to match the second sequence of characters.

* * * * *